UNITED STATES PATENT OFFICE.

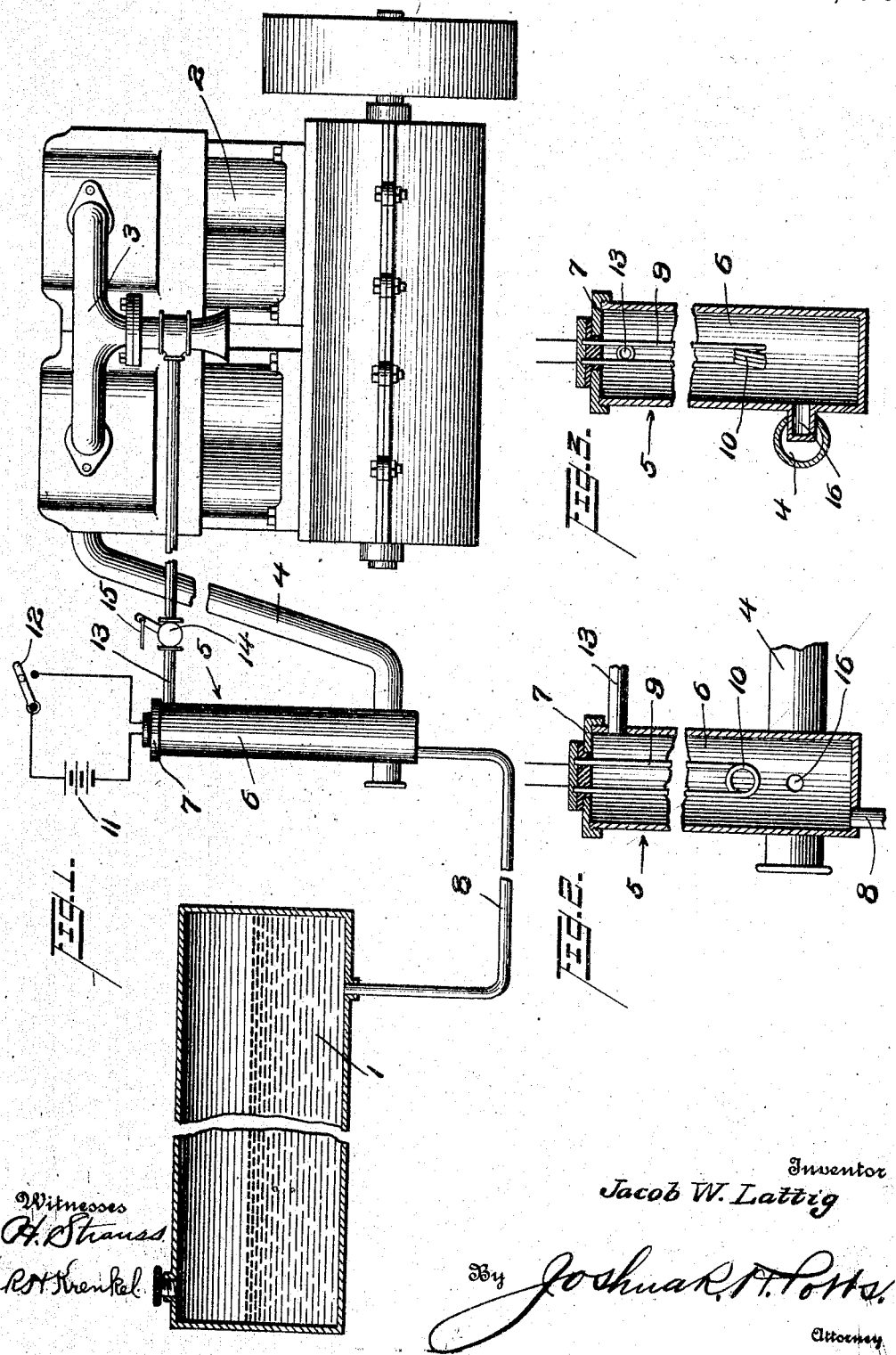

JACOB WILLIAM LATTIG, OF GLENSIDE, PENNSYLVANIA.

GAS-GENERATOR FOR INTERNAL-COMBUSTION ENGINES.

1,175,459. Specification of Letters Patent. Patented Mar. 14, 1916.

Application filed October 8, 1912. Serial No. 724,495.

*To all whom it may concern:*

Be it known that I, JACOB WILLIAM LATTIG, a citizen of the United States, residing at Glenside, in the county of Montgomery and State of Pennsylvania, have invented certain new and useful Improvements in Gas-Generators for Internal-Combustion Engines, of which the following is a specification.

My invention relates to improvements in gas generators, for internal combustion engines, the object of the invention being to provide an improved gas generator in the form of a column of liquid interposed between the supply tank and the engine, and in which column the liquid is subjected to the action of a heating agent to vaporize the liquid and permit the gas thus formed to pass under pressure to the engine, commingling with the air before entrance into the explosion chambers.

A further object is to provide a gas generating liquid column which is heated electrically for initial gas generation, and is also heated through the medium of the heat units in the exploded gases contained in the exhaust pipe, so that after the initial generation of gas, the exhaust from the engine is utilized to continue the vaporization or gas generation in the column.

A further object is to provide a liquid column so located between the liquid supply tank and the engine that the level of liquid in the column is automatically maintained, and provide in said column heating means which causes the liquid to vaporize in the upper end of the column, and as such vapor accumulates, due to the pressure of the vapor, the liquid in the column is forced downwardly, so that when an excess of vapor is in the column, the liquid will be forced below the point of heating, whereby the vaporization is automatically stopped.

With these and other objects in view, the invention consists in certain novel features of construction and combinations and arrangements of parts as will be more fully hereinafter described and pointed out in the claims.

In the accompanying drawings: Figure 1 is a diagrammatic view partly in section and partly in elevation illustrating my improvements. Fig. 2 is a view in longitudinal section through the gas generator. Fig. 3 is a view similar to Fig. 2, but taken at right angles thereto.

1 represents a liquid supply tank and 2 an internal combustion engine having the ordinary manifold intake 3 and exhaust pipe 4. Interposed between the tank 1 and the engine 2 is located my improved gas generator 5.

This gas generator comprises a casing 6 which may be cylindrical in form as illustrated and is provided at its upper end with a removable cover 7.

While I have illustrated the gas generator in the form of a cylinder, I would have it understood that this generator may be in any form which will contain a column of liquid, and hence I shall hereinafter refer to the generator chamber as a liquid column because in the chamber a column of liquid is maintained which initially has the same level as the liquid in the tank 1, but as the liquid is vaporized and accumulates in the upper end of the column, this liquid level descends, all of which will more fully hereinafter appear.

The lower end of the casing 6 is connected by a pipe 8 with the bottom of tank 1, so that the tank maintains a continuous supply of liquid to the column and the pipe 8 acts as a trap to prevent the passage of gas to the tank.

An electric heater 9 is supported in the cover 7, and the heating coil 10 thereof is located an appreciable distance below the cover, and is normally submerged in the liquid in the column. This electric heater is illustrated diagrammatically in Fig. 1 as included in an electric circuit with a source of electricity supply 11, and a switch 12.

It is to be understood that the switch will be located in convenient position to be moved by the operator. The upper end of the chamber or column is connected by a pipe 13 with the intake manifold 3, so that the gas from the generator commingles with the air and is supplied to the combustion chambers in the proportion desired, such proportion being regulated by a throttle valve 14 which is located in the pipe 13, and is preferably provided with a connection 15 which enables the throttle valve to be controlled by the operator.

It is to be understood, of course, that when my improvements are in use upon a motor vehicle, the control of the throttle valve and the switch 12 will be located in convenient reach of the chauffeur.

The exhaust pipe 4 from the engine is positioned beside the gas generator and into the same a closed tubular extension 16 on the gas generator projects. In other words, this tubular extension 16 which is located below the normal liquid level in the generator or column projects into the exhaust pipe, and is heated by the exhaust so that this heat may be utilized alone or in conjunction with the electric heater to generate the gas in the desired quantity.

As above stated, the liquid is normally at the same level in the tank 1 and in the generator, so that the column of liquid in the generator submerges the coil 10 of the electric heater and fills the tubular extension 16.

The switch 12 is moved to close the electric circuit and the heat of the electric coil causes the liquid to vaporize and accumulate in the upper end of the generator. As this vapor is formed, the pressure in the upper end of the generator will increase to the extent that the liquid column is forced downwardly and overcomes the pressure of the liquid in the tank, so that the gas chamber is gradually increased.

When the throttle valve 14 is opened or partially opened, the gas will pass through the pipe 13 to the intake manifold 3 and commingle with the air supply, to form the necessary combustible mixture, the proportion of the gas being regulated by the throttle valve.

As the engine begins to operate, the exploded gases in the exhaust pipe 4 will heat the tubular extension 16 and assist the electric heater to generate the gas. If the exhaust is sufficiently hot, the electric heater may be cut out and the exhaust relied upon for generating the gas.

If the gas accumulates too rapidly, the result will be that the liquid column will be forced downwardly below the heating point. In other words, the liquid level will fall below the coil 10 and then below the tubular extension 16, so that vaporization will cease until the surplus gas is exhausted and the liquid level rises.

With my improvements, while gasolene is used preferably, it is possible to use other forms of volatile liquid fuel, and hence the invention is not limited to the particular liquid employed. Furthermore, the parts are illustrated diagrammatically and may be modified to suit conditions.

It will be noted that as the gas is generated in a closed chamber, its outlet is controlled absolutely by the throttle valve and hence when the engine is at an incline, the supply of gas and liquid fuel may be entirely shut off. This is especially advantageous upon motor vehicles when running down hill. With the ordinary carbureters, a certain amount of liquid flows by gravity into the engine. With my improvements, no liquid nor gas will flow to the engine and only pure air will be sucked into the cylinder while coasting thus enabling the cylinders to be thoroughly scavenged by the air.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A gas generator comprising an air tight casing adapted to contain volatile liquid, a pipe connecting a source of liquid supply with the bottom of said casing, an outlet pipe communicating with the upper portion of said casing, a valve in said last-mentioned pipe, a closed tube projecting outwardly from the lower portion of the casing, and lying in the path of the exhaust of an engine, substantially as described.

2. A gas generator comprising an air tight casing adapted to contain volatile liquid, a pipe connecting a source of liquid supply with the bottom of said casing, an outlet pipe communicating with the upper portion of said casing, a valve in said last-mentioned pipe, a closed tube projecting outwardly from the lower portion of the casing, and lying in the path of the exhaust of an engine, and an electric heater projecting through the top of the casing and extending longitudinally thereof, substantially as described.

In testimony whereof I have signed my name to this specification in the presence of two subscribing witnesses.

JACOB WILLIAM LATTIG.

Witnesses:
C. R. ZIEGLER,
S. W. FOSTER.